United States Patent
Sim-Tang

(10) Patent No.: US 7,096,392 B2
(45) Date of Patent: Aug. 22, 2006

(54) METHOD AND SYSTEM FOR AUTOMATED, NO DOWNTIME, REAL-TIME, CONTINUOUS DATA PROTECTION

(75) Inventor: Siew Yong Sim-Tang, Saratoga, CA (US)

(73) Assignee: Asempra Technologies, Inc., Sunnyvale, CA (US)

( * ) Notice: Subject to any disclaimer, the term of this patent is extended or adjusted under 35 U.S.C. 154(b) by 3 days.

(21) Appl. No.: 10/841,398

(22) Filed: May 7, 2004

(65) Prior Publication Data

US 2005/0262377 A1    Nov. 24, 2005

(51) Int. Cl.
G06F 11/00    (2006.01)

(52) U.S. Cl. .............................. 714/48; 714/4; 714/18; 714/49

(58) Field of Classification Search .................... 714/4, 714/18, 48, 49, 43; 709/224
See application file for complete search history.

(56) References Cited

U.S. PATENT DOCUMENTS

| | | | |
|---|---|---|---|
| 5,729,743 | A | 3/1998 | Squibb |
| 5,893,119 | A | 4/1999 | Squibb |
| 6,366,988 | B1 | 4/2002 | Skiba et al. |
| 6,393,582 | B1 * | 5/2002 | Klecka et al. ................ 714/11 |
| 6,460,055 | B1 | 10/2002 | Midgley et al. |
| 6,463,565 | B1 | 10/2002 | Kelly et al. |
| 6,487,561 | B1 | 11/2002 | Ofek et al. |
| 6,526,418 | B1 | 2/2003 | Midgley et al. |
| 6,625,623 | B1 | 9/2003 | Midgley et al. |
| 6,751,753 | B1 | 6/2004 | Nguyen et al. |
| 6,779,003 | B1 | 8/2004 | Midgley et al. |
| 6,816,872 | B1 | 11/2004 | Squibb |
| 6,826,711 | B1 | 11/2004 | Moulton et al. |
| 6,836,756 | B1 * | 12/2004 | Gruber ........................ 703/19 |
| 6,847,984 | B1 | 1/2005 | Midgley et al. |
| 6,907,551 | B1 * | 6/2005 | Katagiri et al. ............... 714/57 |
| 6,993,706 | B1 | 1/2006 | Cook |
| 2002/0144177 | A1 * | 10/2002 | Kondo et al. ................. 714/13 |
| 2002/0147807 | A1 * | 10/2002 | Raguseo .................... 709/224 |
| 2002/0178397 | A1 * | 11/2002 | Ueno et al. .................... 714/4 |

* cited by examiner

Primary Examiner—Scott Baderman
Assistant Examiner—Timothy M. Bonura
(74) Attorney, Agent, or Firm—David H. Judson

(57) ABSTRACT

A data management system or "DMS" provides an automated, continuous, real-time, substantially no downtime data protection service to one or more data sources associated with a set of application host servers. To facilitate the data protection service, a host driver embedded in an application server captures real-time data transactions, preferably in the form of an event journal that is provided to other DMS components. The driver functions to translate traditional file/database/block I/O and the like into a continuous, application-aware, output data stream. The host driver includes an event processor that provides the data protection service, preferably by implementing a finite state machine (FSM). In particular, the data protection is provided to a given data source in the host server by taking advantage of the continuous, real-time data that the host driver is capturing and providing to other DMS components. The state of the most current data in DMS matches the state of the data in the host server; as a consequence, the data protection is provided under the control of the finite state machine as a set of interconnected phases or "states." The otherwise separate processes (initial data upload, continuous backup, blackout and data resynchronization, and recovery) are simply phases of the overall data protection cycle. As implemented by the finite state machine, this data protection cycle preferably loops around indefinitely until, for example, a user terminates the service. A given data protection phase (a given state) changes only as the state of the data and the environment change (a given incident).

21 Claims, 7 Drawing Sheets

METHOD AND SYSTEM FOR AUTOMATED, NO DOWNTIME, REAL-TIME, CONTINUOUS DATA PROTECTION

CROSS-REFERENCE TO RELATED APPLICATION

This application is related to commonly-owned application Ser. No. 10/842,286, filed May 10, 2004, and titled "METHOD AND SYSTEM FOR REAL-TIME EVENT JOURNALING TO PROVIDE ENTERPRISE DATA SERVICES."

BACKGROUND OF THE INVENTION

1. Technical Field

The present invention relates generally to enterprise data protection.

2. Background of the Related Art

A critical information technology (IT) problem is how to cost-effectively deliver network wide data protection and rapid data recovery. In 2002, for example, companies spent an estimated $50B worldwide managing data backup/restore and an estimated $30B in system downtime costs. The "code red" virus alone cost an estimated $2.8B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×265 enterprise data centers.

Traditionally, system managers have use tape backup devices to store system data on a periodic basis. For example, the backup device may acquire a "snapshot" of the contents of an entire hard disk at a particular time and then store this for later use, e.g., reintroduction onto the disk (or onto a new disk) should the computer fail. The problems with the snapshot approaches are well known and appreciated. First, critical data can change as the snapshot is taken, which results in incomplete updates (e.g., half a transaction) being captured so that, when reintroduced, the data is not fully consistent. Second, changes in data occurring after a snapshot is taken are always at risk. Third, as storage device size grows, the bandwidth required to repeatedly offload and store the complete snapshot can become impractical. Most importantly, storage based snapshot does not capture fine grain application data and, therefore, it cannot recover fine grain application data objects without reintroducing (i.e. recovering) the entire backup volume to a new application computer server to extract the fine grain data object.

Data recovery on a conventional data protection system is a tedious and time consuming operation. It involves first shutting down a host server, and then selecting a version of the data history. That selected version of the data history must then be copied back to the host server, and then the host server must be re-started. All of these steps are manually driven. After a period of time, the conventional data protection system must then perform a backup on the changed data. As these separate and distinct processes and systems are carried out, there are significant periods of application downtime. Stated another way, with the current state of the art, the processes of initial data upload, continuous backup, data resynchronization, and data recovery, are separate and distinct, include many manual steps, and involve different and uncoordinated systems, processes and operations.

BRIEF SUMMARY OF THE INVENTION

A data management system or "DMS" provides an automated, continuous, real-time, substantially no downtime data protection service to one or more data sources associated with a set of application host servers. The data management system typically comprises one or more regions, with each region having one or more clusters. A given cluster has one or more nodes that share storage. To facilitate the data protection service, a host driver embedded in an application server captures real-time data transactions, preferably in the form of an event journal that is provided to a DMS cluster. The driver functions to translate traditional file/database/block I/O and the like into a continuous, application-aware, output data stream. According to the invention, the host driver includes an event processor that provides the data protection service, preferably by implementing a finite state machine (FSM). In particular, the data protection is provided to a given data source in the host server by taking advantage of the continuous, real-time data that the host driver is capturing and providing to other DMS components. The state of the most current data in DMS matches the state of the data in the host server; as a consequence, the data protection is provided under the control of the finite state machine as a set of interconnected phases or "states." The otherwise separate processes (initial data upload, continuous backup, blackout and data resynchronization, and recovery) are simply phases of the overall data protection cycle. As implemented by the finite state machine, this data protection cycle preferably loops around indefinitely until, for example, a user terminates the service. A given data protection phase (a given state) changes only as the state of the data and the environment change (a given incident).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
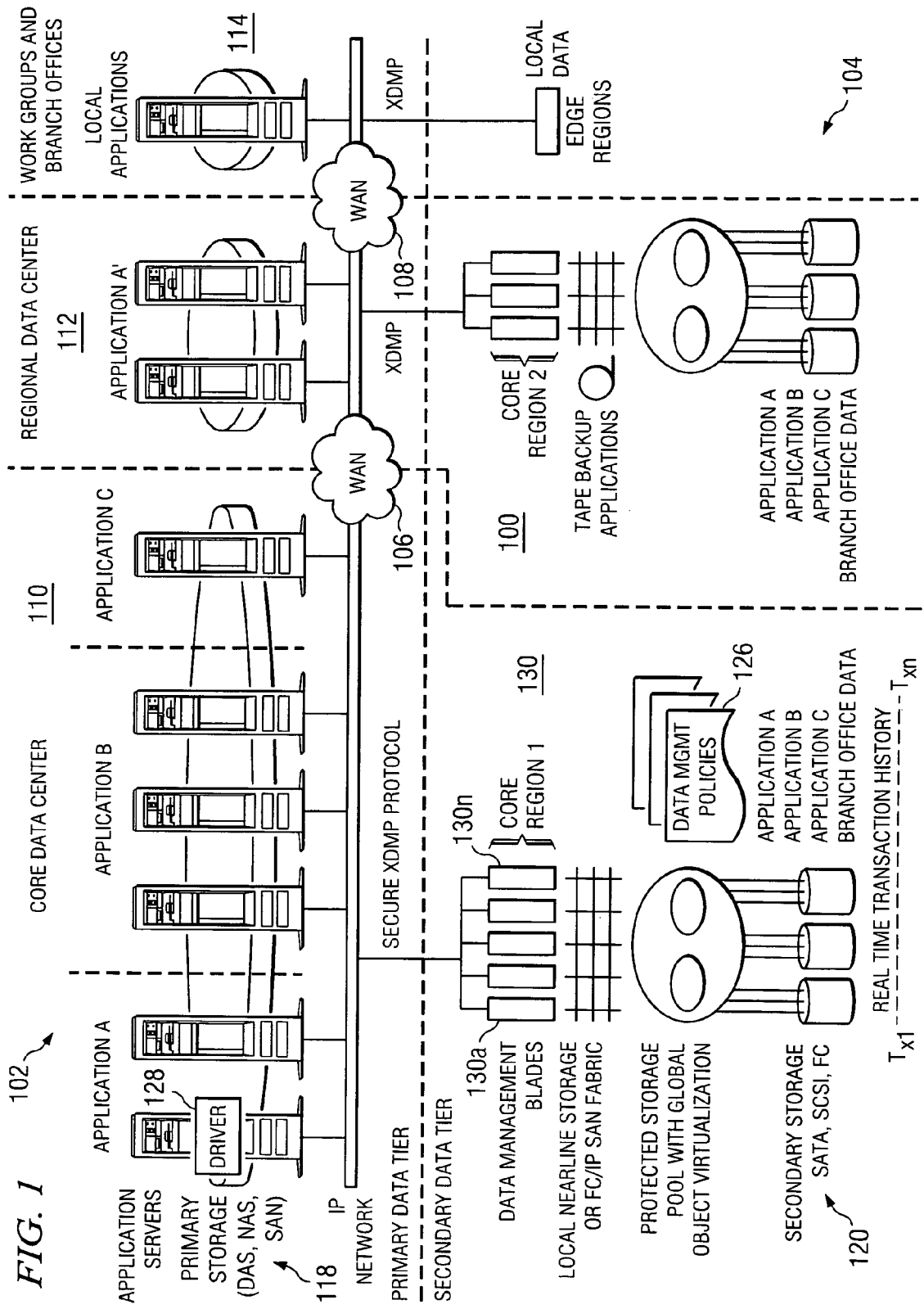
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 does not have its own secondary storage, but relies instead on the facilities in the primary data centers.

As illustrated, a "host driver" 128 is associated with one or more of the application(s) running in the application servers 116 to transparently and efficiently capture the real-time, continuous history of all (or substantially all) transactions and changes to data associated with such application(s) across the enterprise network. As will be described below, the present invention facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a–n that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
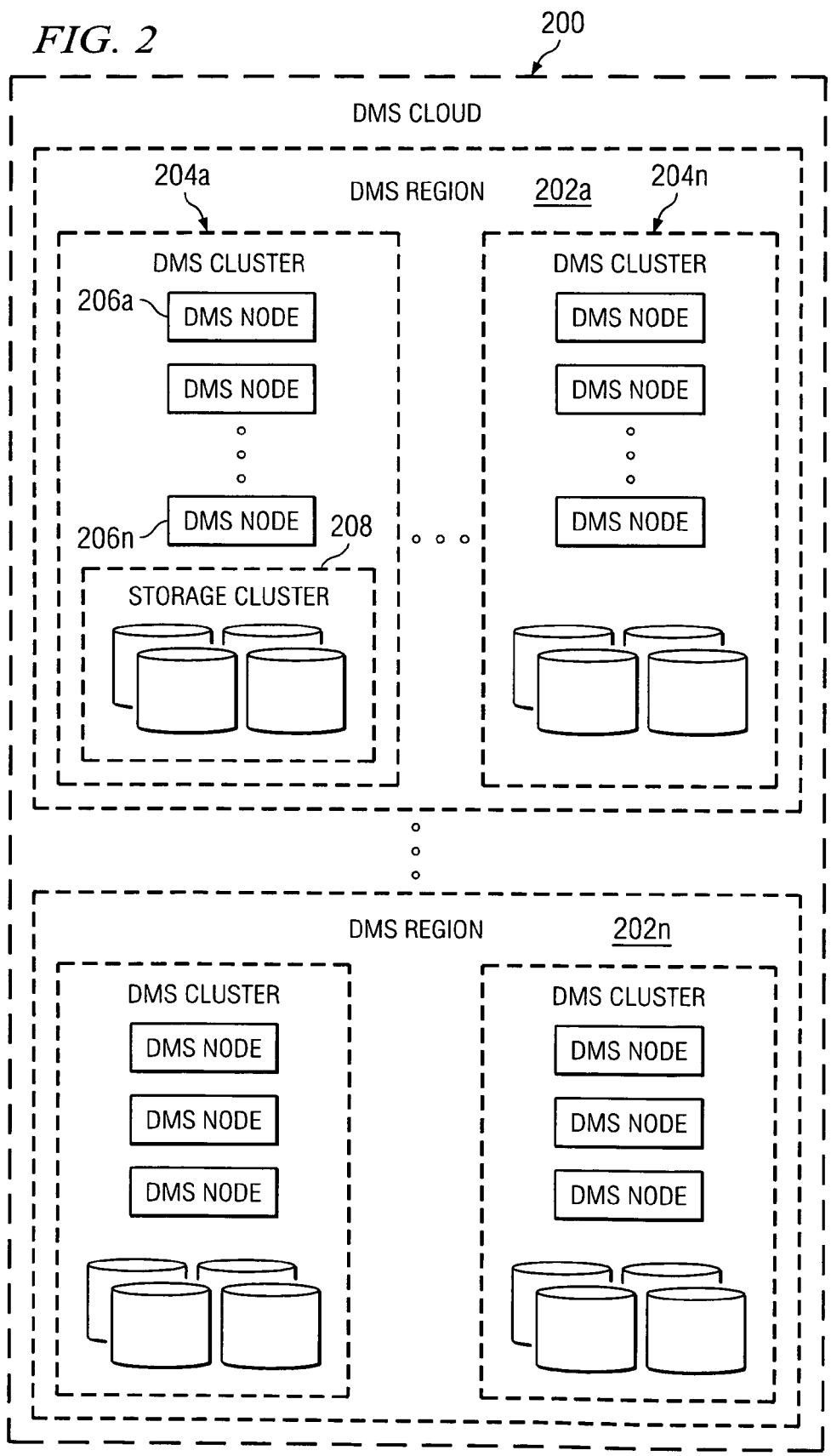
FIG. 2 is an illustration of a general data management system (DMS) of the present invention.

FIG. 2 illustrates a preferred hierarchical structure of a data management system 200. As illustrated, the data management system 200 comprises one or more regions 202a–n, with each region 202 comprising one or more clusters 204a–n. A given cluster 204 includes one or more nodes 206a–n and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be re-directed to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
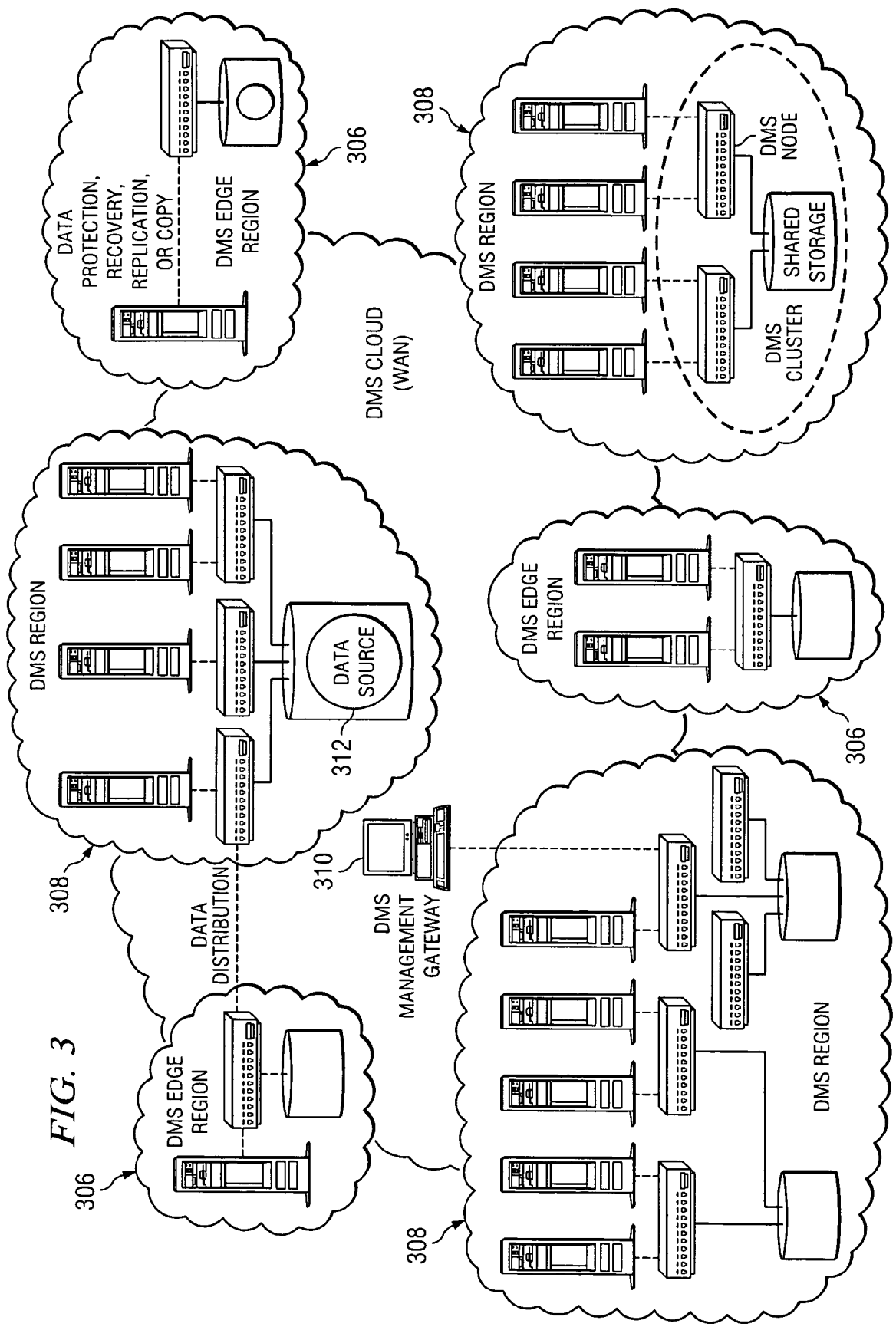
FIG. 3 is an illustration of a representative DMS network according to one embodiment of the present invention.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes one or more management gateways 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand replication to bring in the data.

Figure 4:
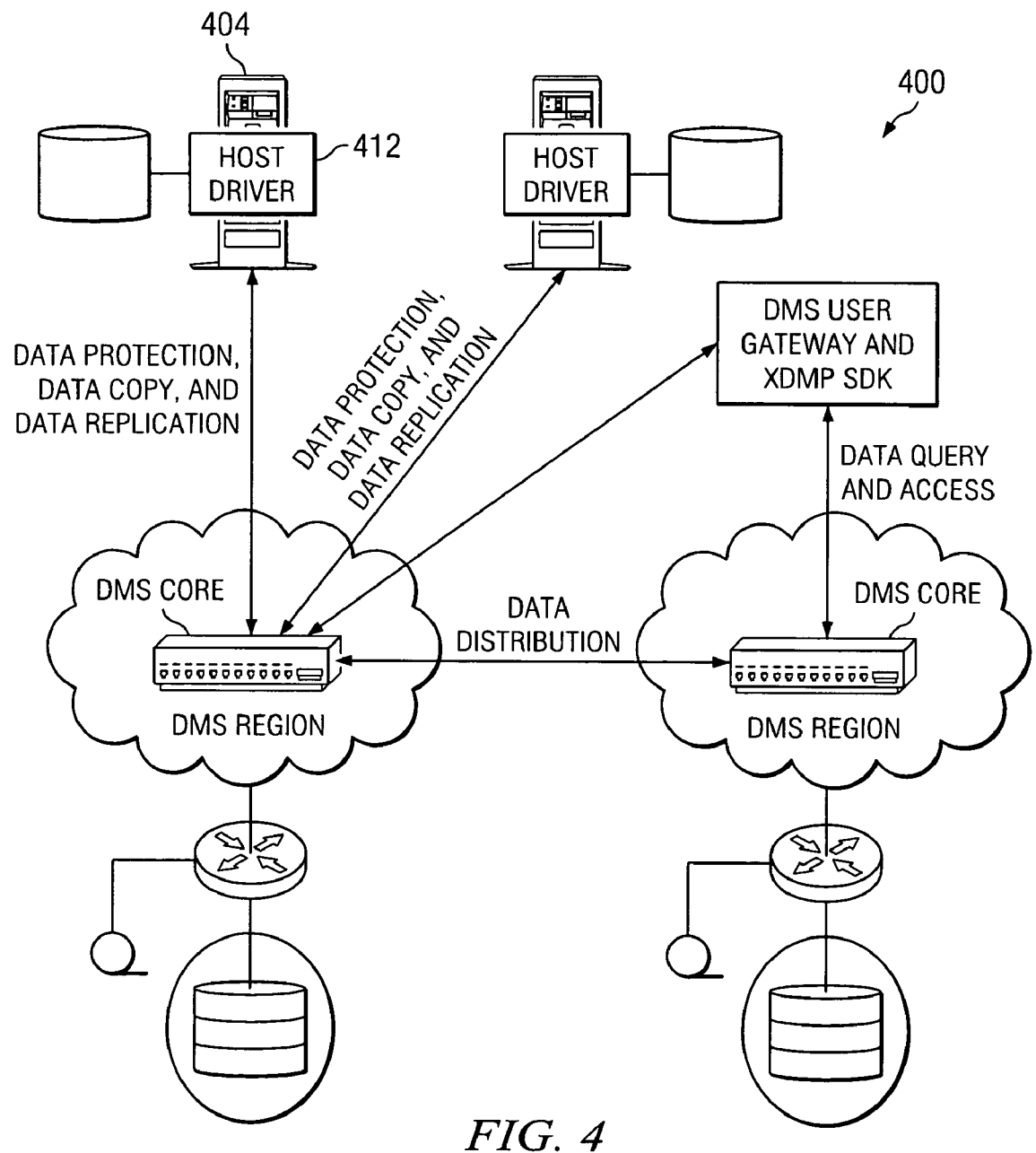
FIG. 4 illustrates how a data management system may be used to provide one or more data services according to the present invention.

Referring now to FIG. 4, an illustrative DMS network 400 provides a wide range of data services to data sources associated with a set of application host servers. As noted above, and as will be described in more detail below, the DMS host driver 402 embedded in an application server 404 connects the application and its data to the DMS cluster. In this manner, the DMS host drivers can be considered as an extension of the DMS cloud reaching to the data of the application servers. As illustrated in FIG. 4, the DMS network offers a wide range of data services that include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, a stream-based data service is a service that involves two end points sending a stream of real-time application and data events. For data protection, this means streaming data from a data source (e.g., an external host server) into a DMS cluster, where the data source and its entire history can be captured and protected. Data distribution refers to streaming a data source from one DMS cluster into another DMS cluster, while data replication refers to streaming a data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or a specific point-in-time in the past, to be retrieved when the data is in a consistent state. These data services are merely representative.

The DMS provides these and other data services in real-time with data and application awareness to ensure continuous application data consistency and to allow for fine grain data access and recovery. To offer such application and data aware services, the DMS has the capability to capture fine grain and consistent data. As will be illustrated and described, a given DMS host driver uses an I/O filter to intercept data events between an application and its primary data storage. The host driver also receives data and application events directly from the application and database.

Figure 5:
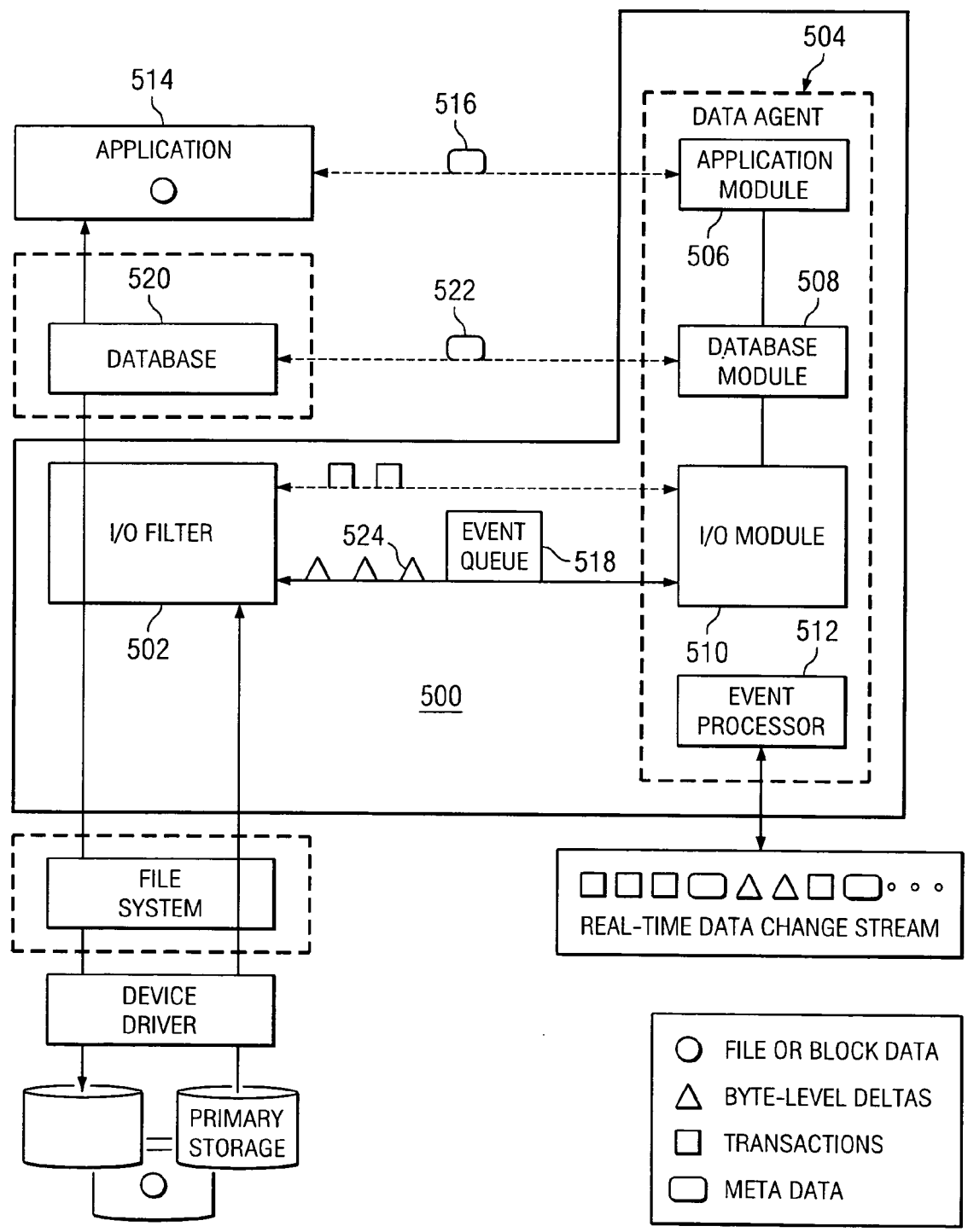
FIG. 5 is a representative host driver according to a preferred embodiment of the present invention having an I/O filter and one or more data agents.

Referring now to FIG. 5, an illustrative embodiment is shown of a DMS host driver 500. As noted above, the host driver 500 may be embedded in the host server where the application resides, or in the network on the application data path. By capturing data through the application, fine grain data is captured along with application events, thereby enabling the DMS cluster to provide application aware data services in a manner that has not been possible in the prior art.

In this embodiment, a host server embedded host driver is used for illustrating the driver behavior. In particular, the host driver 500 in a host server connects to one of the DMS nodes in a DMS cluster (in a DMS region) to perform or facilitate a data service. The host driver preferably includes two logical subsystems, namely, an I/O filter 502, and at least one data agent 504. An illustrative data agent 504 preferably includes one or more modules, namely, an application module 506, a database module 508, an I/O module 510, and an event processor or event processing engine 512.

The application module 506 is configured with an application 514, one or more network devices and/or the host system itself to receive application level events 516. These events include, without limitation, entry or deletion of some critical data, installation or upgrade of application software or the operating system, a system alert, detecting of a virus, an administrator generated checkpoint, and so on. One or more application events are queued for processing into an event queue 518 inside or otherwise associated with the data agent. The event processor 512 over time may instruct the application module 506 to re-configure with its event source to capture different application level events.

If an application saves its data into a database, then a database module 508 is available for use. The database module 508 preferably registers with a database 520 to obtain notifications from a database. The module 508 also may integrate with the database 520 through one or more database triggers, or it may also instruct the database 520 to generate a checkpoint 522. The database module 508 also may lock the database 520 to force a database manager (not shown) to flush out its data from memory to disk, thereby generating a consistent disk image (a binary table checkpoint). This process is also known as "quiescing" the database. After a consistent image is generated, the database module 508 then lifts a lock to release the database from its quiescent state. The database events preferably are also queued for processing into the event queue 518. Generalizing, database events include, without limitation, a database checkpoint, specific database requests (such as schema changes or other requests), access failure, and so on. As with application module, the event processor 512 may be used to re-configure the events that will be captured by the database module.

The I/O module 510 instructs the I/O filter 502 to capture a set of one or more I/O events that are of interest to the data agent. For example, a given I/O module 510 may control the filter to capture I/O events synchronously, or the module 510 may control the filter to only capture several successful post I/O events. When the I/O module 510 receives I/O events 524, it forwards the I/O events to the event queue 518 for processing. The event processor 512 may also be used to re-configure the I/O module 510 and, thus, the I/O filter 502.

The event processor 512 functions to generate an application aware, real-time event journal (in effect, a continuous stream) for use by one or more DMS nodes to provide one or more data services. Application aware event journaling is a technique to create real-time data capture so that, among other things, consistent data checkpoints of an application can be identified and metadata can be extracted. For example, application awareness is the ability to distinguish a file from a directory, a journal file from a control or binary raw data file, or to know how a file or a directory object is modified by a given application. Thus, when protecting a general purpose file server, an application aware solution is capable of distinguishing a file from a directory, and of identifying a consistent file checkpoint (e.g., zero-buffered write, flush or close events), and of interpreting and capturing file system object attributes such as an access control list. By interpreting file system attributes, an application aware data protection may ignore activities applied to a temporary file. Another example of application awareness is the ability to identify a group of related files, directories or raw volumes that belong to a given application. Thus, when protecting a database with an application aware solution, the solution is capable of identifying the group of volumes or directories and files that make up a given database, of extracting the name of the database, and of distinguishing journal files from binary table files and control files. It also knows, for example, that the state of the database journal may be more current than the state of the binary tables of the database in primary storage during runtime. These are just representative examples, of course. In general, application aware event journaling tracks granular application consistent checkpoints; thus, when used in conjunction with data protection, the event journal is useful in reconstructing an application data state to a consistent point-in-time in the past, and it also capable of retrieving a granular object in the past without having to recover an entire data volume.

Figure 6:
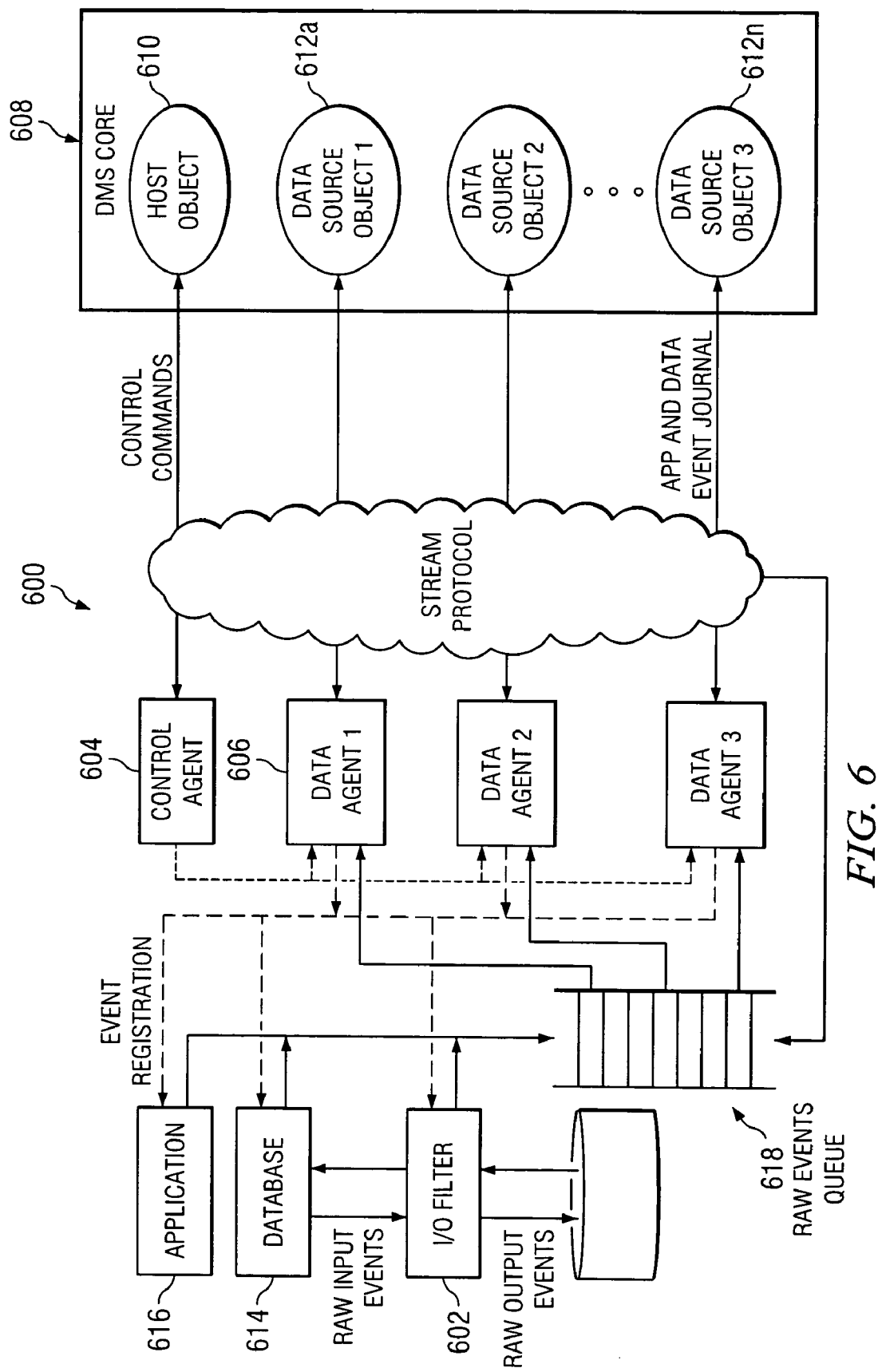
FIG. 6 illustrates the host driver architecture in a more general fashion.

Referring now to FIG. 6, the host driver architecture is shown in a more generalized fashion. In this drawing, the host driver 600 comprises an I/O filter 602, a control agent 604, and one or more data agents 606. The control agent 604 receives commands from a DMS core 608, which may include a host object 610 and one or more data source objects 612a–n, and it controls the behavior of the one or more data agents 606. Preferably, each data agent 606 manages one data source for one data service. For example, data agent 1 may be protecting directory "dir1," data agent 2 may be copying file "foo.html" into the host, and data agent 3 may be protecting a database on the host. These are merely representative data service examples, of course. Each data agent typically will have the modules and architecture described above and illustrative in FIG. 5. Given data agents, of course, may share one or more modules depending on the actual implementation. In operation, the data agents register as needed with the I/O filter 602, the database 614 and/or the application 616 to receive (as the case may be): I/O events from the I/O filter, database events from the database, and/or application events from the application, the operating system and other (e.g., network) devices. Additional internal events or other protocol-specific information may also be inserted into the event queue 618 and dispatched to a given data agent for processing. The output of the event processor in each data agent comprises a part of the event journal.

Figure 7:
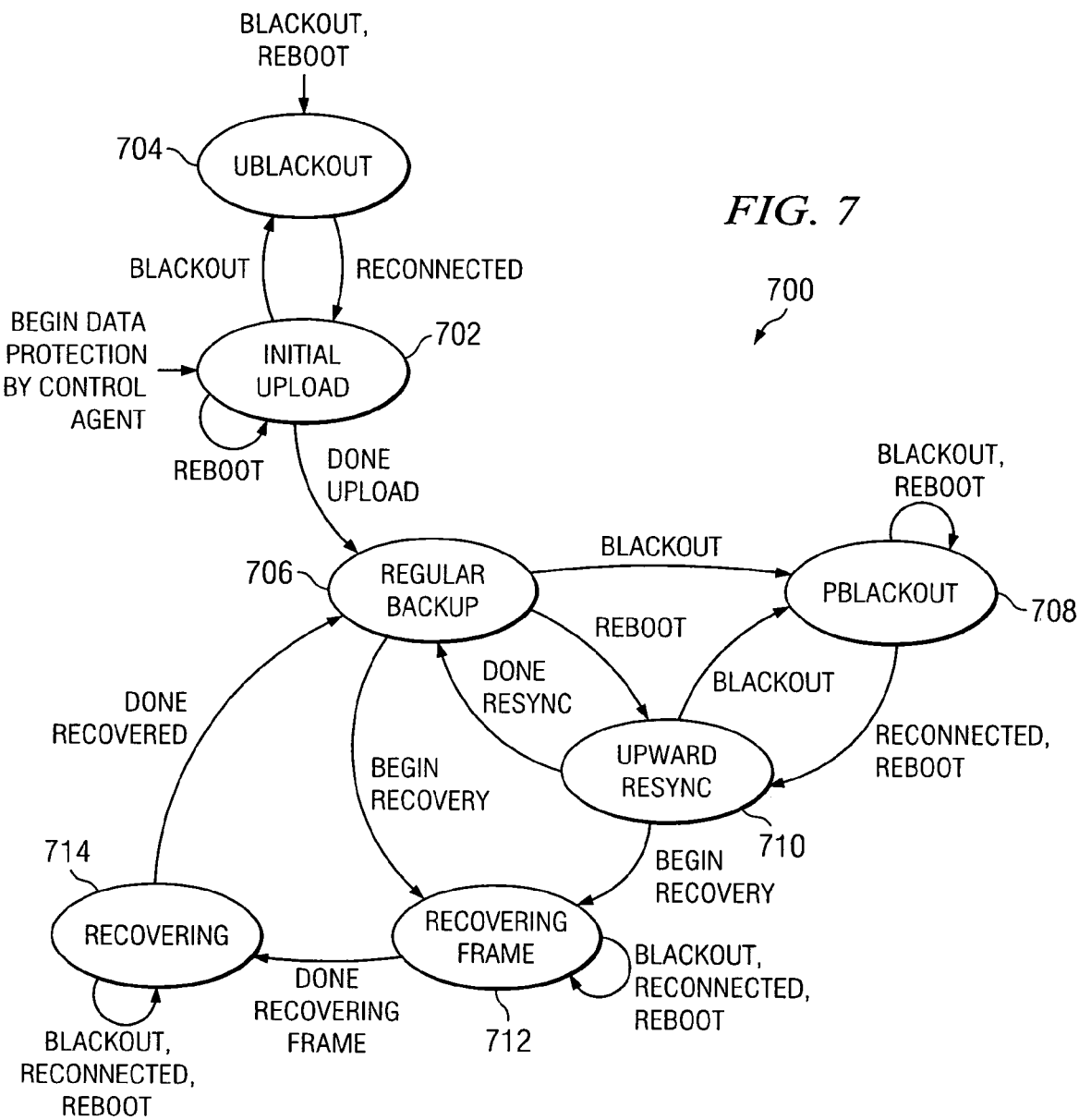
FIG. 7 illustrates a preferred implementation of a event processor finite state machine (FSM) that provides automated, real-time, continuous, zero downtime data protection service according to the present invention.

FIG. 7 illustrates a preferred embodiment of the invention, wherein a given event processor in a given host driver provides a data protection service by implementing a finite state machine 700. As will be seen, the behavior of the event processor depends on what state it is at, and this behavior preferably is described in an event processor data protection state table. The "state" of the event processor preferably is driven by a given "incident" as described in an event processor data protection incident table. Generally, when a given incident occurs, the state of the event processor may change. The change from one state to another is sometimes referred to as a transition. One of ordinary skill in the art will appreciate that FIG. 7 illustrates a data protection state transition diagram of the given event processor. In particular, it shows an illustrative data protection cycle as the FSM 700. At each state, as represented by an oval, an incident, as represented by an arrow, may or may not drive the event processor into another state. The tail of an incident arrow connects to a prior state (i.e., branches out of a prior state), and the head of an incident arrow connects to a next state. If an incident listed incident table does not branch out from a state, then it is invalid for (i.e., it cannot occur in) that state. For example, it is not possible for a "Done-Upload" incident to occur in the "UBlackout" state.

With reference now to FIGS. 6–7, the inventive data protection service is initiated on a data source in a host server as follows. As illustrated in FIG. 6, it is assumed that a control agent 604 has created a data agent 606 having an event processor that outputs the event journal data stream, as has been described. As this point, the event processor in the data agent 606 is transitioned to a first state, which is called "Initial-Upload" for illustrative purposes. During the "Initial-Upload" state 702, the event processor self-generates upload events, and it also receives other raw events from its associated event queue. The event processor simultaneously uploads the initial baseline data source, and it backs up the on-going changes from the application. Preferably, only change events for data already uploaded are sent to the DMS. The event processor also manages data that is dirty or out-of-sync, as indicated in a given data structure. In particular, a representative data structure is a "sorted" source tree, which is a list (sorted using an appropriate sort technique) that includes, for example, an entry per data item. The list preferably also includes an indicator or flag specifying whether a given data item is uploaded or not, as well as whether the item is in-(or out-of) sync with the data in the DMS. As will be seen, the event processor performs resynchronization on the items that are out-of-sync. As indicated in FIG. 7, a "Reboot" incident that occurs when the state machine is in state 702 does not change the state of the event processor; rather, the event processor simply continues processing from where it left off. In contrast, a "Blackout" incident transitions the event processor to a state 704 called (for illustration only) "UBlackout." This is a blackout state that occurs as the event processor uploads the initial baseline data source, or as the event processor is backing up the on-going changes from the application. The state 704 changes back to the "Initial-Upload" state 702 when a so-called "Reconnected" incident occurs.

When upload is completed and all the data is in synchronized with the data in the DMS, the event processor generates a "Done-upload" incident, which causes the event processor to move to a new state 706. This new state is called "Regular-backup" for illustrative purposes. During the regular backup state 706, the event processor processes all the raw events from the event queue, and it generates a meaningful checkpoint real time event journal stream to the DMS for maintaining the data history. This operation has been described above. As illustrated in the state transition diagram, the event processor exits its regular backup state 706 under one of three (3) conditions: a blackout incident, a reboot incident, or a begin recovery incident. Thus, if during regular backup a "Blackout" incident occurs, the state of the event processor transitions from state 706 to a new state 708, which is called "PBlackout" for illustration purposes. This is a blackout state that occurs during regular backup. If, however, during regular backup, a "Reboot" incident occurs, the event processor transitions to a different state 710, which is called "Upward-Resync" for illustrative purposes. The upward resynchronization state 710 is also reached from state 708 upon a Reconnected incident during the latter state. Upward resynchronization is a state that is entered when there is a suspicion that the state of the data in the host is out-of-sync with the state of the most current data in the DMS. For this transition, it should also be known that the data in the host server is not corrupted. Thus, a transition from state 706 to state 710 occurs because, after "Reboot," the event processor does not know if the data state of the host is identical with the state of the data in DMS. During the "Upward-Resync" 710 state, whether the state is reached from state 706 or state 708, the event processor synchronizes the state of the host data to the state of the DMS data (in other words, to bring the DMS data to the same state as the host data). During this time, update events (to the already synchronized data items) are continuously forwarded to the DMS as a real time event stream. When the resynchronization is completed, the data state at both the host and the DMS are identical, and thus a "Done-Resync" incident is generated. This incident transitions the event processor back to the "Regular-backup" state 706. Alternatively, with the event processor in the Upward-Resync state 710, a "Begin-Recovery" incident transitions the event processor to yet another new state 712, which is referred to "Recovering-frame" for illustration purposes.

In particular, once a baseline data is uploaded to the DMS, data history is streamed into the DMS continuously, preferably as a real time event journal. An authorized user can invoke a recovery at any of the states when the host server is connected to the DMS core, namely, during the "Regular-backup" and "Upward-resync" states 706 and 710. If the authorized user does so, a "Begin-recovery" incident occurs, which drives the event processor state to the "Recovering-frame" state 712.

During the "Recovering-frame" state 712, the event processor reconstructs the sorted source tree, which (as noted above) contains structural information of the data to be recovered. During state 712, and depending on the underlying data, the application may or may not be able to access the data. Once the data structure is recovered, a "Done-Recovering-Frame" incident is generated, which then transitions the event processor to a new state 714, referred to as "Recovering" for illustration purposes. Before the data structure is recovered, incidents such as "Blackout," "Reconnected," and "Reboot" do not change the state of the event processor. During the "Recovering" state 714, the event processor recovers the actual data from the DMS, preferably a data point at a time. It also recovers data as an application access request arrives to enable the application to continuing running. During state 714, application update events are streamed to the DMS so that history is continued to be maintained, even as the event processor is recovering the data in the host. When data recovery is completed, once again the state of the data (at both ends of the stream) is synchronized, and the corruption at the host is fixed. Thus, a so-called "Done-recovered" incident is generated, and the event processor transitions back to the "Regular-backup" state 706.

During the "UBlackout" or the "PBlackout" states (704 or 708), the event processor marks the updated data item as dirty or out-of-sync in its sorted source tree.

Processing continues in a cycle (theoretically without end), with the event processor transitioning from state-to-state as given incidents (as described above) occur. The above described incidents, of course, are merely representative.

Although not indicated in the state transition diagram, a "termination" incident may be introduced to terminate the data protection service at a given state. In particular, a termination incident may apply to a given state, or more generally, to any given state, in which latter case the event processor is transitioned (from its then-current state) to a terminated state. This releases the data agent and its event processor from further provision of the data protection service.

The following Table I provide additional details of a preferred implementation of the event processor data protection state table 702 and the event processor data protection incident table 704.

State Table:

| State | Description |
| --- | --- |
| Initial-upload | When a data protection command is forwarded from a control agent to a data agent, Initial-Upload is the entrance state of the event processor. At this state, the event processor gathers the list of data items of the data source to be protected to create a data list, and then one at a time, moves the data to create initial baseline data on a DMS region through a DMS core. The data list is called the sorted source tree. The upload is a stream of granular application-aware data chunks that are attached to upload events. During this phase, the application does not have to be shutdown. Simultaneously, while the baseline is uploading and as the application updates the data on the host, the checkpoint granular data, metadata, and data events are, in real-time, continuously streamed into the DMS core. The update events for the data that are not already uploaded are dropped; preferably, only the update events for data already uploaded are streamed to the DMS. The DMS core receives the real time event journal stream that includes the baseline upload events and the change events. It processes these events and organizes the data to maintain their history in the DMS persistent storage. If DMS fails while processing an upload or an update data event, preferably a failure event is forwarded back to the data agent and entered into the queue as a protocol specific event. The event processor marks the target item associated with the failure "dirty" (or out-of-sync) and then performs data synchronization with the DMS on that target item. |
| UBlackout | This is a blackout state during Initial-upload. A blackout occurs when the connection from a data agent to a DMS core fails. This failure may be caused by network failure, or by a DMS node failure. During this state, the application continues to run; it updates the data, the updates are captured asynchronously by the I/O filter. The event processor records (within the sorted source tree, for example) that given application-aware data items have changed (i.e., are dirty or out-of-sync). An application-aware data item includes a file, a transaction, a record, an email or the like. Although these items are opaque to the event processor, they are meaningful as a unit to their application. |

-continued

State Table:

| State | Description |
|---|---|
| | If DMS fails while processing an upload or an update data event, preferably a failure event is forwarded back to the data agent and entered into the queue as a protocol specific event. The event processor marks the target item associated with the failure "dirty" (or out-of-sync) and then performs data synchronization with the DMS on that target item. |
| Regular-backup | This is a regular backup state when uploads are completed. In this state, the latest data state in the DMS is identical with the state of the data in the host server (when there is no failure). During this phase, as the application accesses its data, real-time continuous event journal is streamed into the DMS core. The DMS core receives the real time event journal stream, processes these events, and organizes the data in the DMS persistent storage to maintain their history. |
| PBlackout | This is a blackout state that occurs during Regular-backup or Upward-resync. A blackout occurs when the connection from a data agent to a DMS core fails. This failure may be caused by network failure, or by the DMS node failure. As in UBlackout, during this state, the application continues to update the data, the updates are captured asynchronously by the I/O filter, and the event processor simply records (e.g., in the sorted source tree) what application-aware data items have changed. |
| Upward-resync | This state is entered when there is a suspicion that the state of the data in the host is out-of-sync with the state of the most current data in the DMS, and it is also known that the data in the host server is not corrupted. This state is entered after a blackout when data in the host is changed; or, the state is entered after a host server is rebooted and the state of the most current data at the DMS is unknown. During this state, it is assumed that the host server data is good and is more current then the latest data in the DMS. If the event processor is keeping track of the updated (dirty) data at the host server during a blackout, preferably it only compares that data with the corresponding copy in the DMS; it then sends to the DMS the deltas (e.g., as checkpoint delta events). If, during the case of a host server reboot, the dirty data are not known, preferably the event processor goes over the entire data source, re-creates a sorted source tree, and then compares each and every individual data item, sending delta events to the DMS when necessary. During this phase, the application does not have to be shutdown. Upward-resynchronization occurs simultaneously while the application is accessing and updating the data in the primary storage. The update events for the data objects that are dirty and are not yet re-synchronized preferably are dropped; the other events are processed. The event processor tracks both the resynchronization and update activities accordingly and outputs to the DMS core a real time event journal stream. The DMS core receives the real time event journal stream, which includes requests for data checkpoints, resynchronization delta events, and the change events. The DMS core processes these events and organizes the data in the DMS persistent storage to maintain their history. |
| Recovering-frame | Recovery is initiated by an authorized user who identifies that the primary copy of the data in the host server has become incorrect or corrupted. A recovery can be applied to an entire data source, or to a subset of a data source. When a recovery initiative is handled in a DMS core, the DMS core immediately freezes and terminates the backup process of the target data to be recovered, e.g., by sending a recovery command either directly to the data agent or to the control agent. In an illustrative embodiment, the DMS core may also adjust its most current data state to bring forward the target history to be recovered to be the most current state. For example, if a file has four versions (v4, v3, v2, v1), and if an authorized user wants to recover to version 2, the DMS core creates a version 5, which content is identical to version 2, i.e., v5 = v2, v4, v3, v2, v1. Recovering-frame is an entrance state into data recovery at the host server. During this state, the event processor first instructs the I/O filter to filter the READ requests synchronously so that it can participates in the handling of data access requests. It also preferably instructs the I/O filter to fail all the WRITE requests by returning error to the caller. When READ requests arrive, depend on the requesting target, the event processor may serve the data or fail the request. Simultaneously, the event processor gets from the DMS core the list of the data items at the specific point-in-time to be recovered and constructs a recovery list, e.g., a new sorted source tree. Once the list is in place, the event processor first uses the list to recover the data structure in the primary storage, and then transitions into Recovering state. |
| Recovering | This is the next state of a recovery process. After Recovering-frame is completed, the event processor must have already recovered the data structure in the primary storage. During Recovering state, the event processor re-configures the I/O filter to filter all the READ and WRITE events synchronously so that it can |

-continued

State Table:

| State | Description |
|---|---|
| | participate in handling data access. The event processor also begins recovering the actual data, e.g., by going down the new sorted source tree one item at a time to request the data or the delta to apply to its corrupted data.
When an access request for data that has not been recovered (which can be detected using the sorted source tree) arrives, the event processor immediately recovers the requested data.
When update events arrive, the event processor processes the data and sends the real-time event journal to the DMS for backup. The update events also pass down to the primary storage. The event processor also must mark the item recovered so that the most recent data does not get overwritten by data from the DMS.
This type of recovery is called Virtual-On-Demand recovery; it allows recovery to happen simultaneously while an application accesses and updates the recovering data.
If the state of the DMS data is adjusted prior to the host recovery, then only the stream of backup events needs to be applied to the data in the DMS. If the data state at the DMS is not adjusted prior to recovery, then as the recovering data overwrites the host data, the recovery events must be shipped back to the DMS along with the most current application data update events to adjust the data state of the DMS data. |

Incident Table:

| Incident | Description |
|---|---|
| Blackout | Environmental changed.
Network connection is interrupted or the connected DMS core goes down. |
| Reconnected | Environmental changed.
Network connection to a DMS core resumed and the data service can be continued. |
| Done-upload | Data state in the DMS changed.
A baseline copy of the entire data source is fully uploaded to the DMS. |
| Reboot | Environmental changed.
The host server or the data agent is restarted. |
| Done-resync | Data state in the DMS changed.
The state of the data in the host server is, from this incident onward, in synchronized with the most current point-in-time data in the DMS. |
| Begin-recovery | Data state changed as initiated by user.
The state of the data (entire or partial) at the host server is incorrect or corrupted and has to be recovered using a former point-in-time data in the DMS. |
| Done-recovering-frame | Data state in the host server changed
At this point on, the structure of the host data is recovered to the intended recovering point-in-time. |
| Done-recovered | Data state in the host server changed
At this point on, the data state of the host server is fully recovered and fully in synchronized with the most current point-in-time data state of the data source at the DMS. |

Variants:

The finite state switching mechanism as described above may be varied. It may be implemented by breaking up a given state (as described) into multiple smaller states, or by combining two or more states into a more complex state. In addition, one of ordinary skill in the art will appreciate that some of the incidents and behaviors may be adjusted and/or re-ordered to achieve the same goal of providing the continuous, real-time, substantially no downtime data protection service. Thus, for example, the "UBlackout" state may be combined with the "Initial-upload" state into one state that manages data uploads, data updates, and that is aware of the connection status. The "Recovering-frame" state may be combined with the "Recovering" state into one state that performs data structure and data recovery as a process. The "PBlackout" state may be combined with the "Regular-backup" state. The "PBlackout" state may also be combined with the "Upward-resync" state. All three states "PBlackout," "Regular-backup" and "Upward-resync" may be merged into one state that has a process to carry out the combined functions. Also, the "Initial-upload" state may be split into two states with the new state being the target state of the "Reconnected" incident after the "UBlackout" state. This new upload state may include a process to compare the DMS and host data, and this state may be connected back to the "Initial-upload" state through a new incident, such as "Done-compare." There may also be a new state that handles data comparison from the "Initial-upload" state after the "Reboot" incident, and that new state would be connected back to "Initial-upload" via a new incident, such as "Done-compare." As another variant, each of the "Recovering-frame" and "Recovering" states may also be split into two states, with the new states being used to handle data comparison after the "Reconnected" or "Reboot" incidents, as the case may be.

As can be seen, the finite state machine illustrated in the embodiment of FIG. 7 should not be taken to limit the present invention, although it is a desirable implementation. More generally, the finite state machine may be implemented in any convenient manner in which the initial data upload, continuous backup, data resynchronization and data recovery can be seen to comprise an integrated data protection cycle provided to the data source without (at the same time) interrupting the application aware, real-time event data stream that is being generated by the data agent. Thus, any finite state machine (FSM) or similar process or structure that protects the data source without interrupting the application aware, real-time data stream, e.g., by continuously transitioning among a set of connected operating states, may be deemed to be within the scope of the present invention. As noted above, these operating states typically include several or all of the following: initial data upload, continuous backup, data resynchronization, and data recovery.

One of ordinary skill will also appreciate that the finite state machine may be entered at states other than Initial-upload. Thus, for example, an IT administrator may use a new server to recover a data source, and then have the new server act as the master server where the application runs. DMS continues protect the data. In such case, another entry point into the state diagram would then exist, and that entry point may be an incident labeled (for illustrative purposes only) "Recover and Begin Data Protection." In this scenario, the new server enters the FSM at "Recovering-Frame" and then transitions to "Recovering" and then "Regular-Backup," as previously described. As another example, assume an IT administrator makes a copy of the data on a new server and now wishes to provide (via DMS) data protection to that data source with respect to that new server. In this scenario, the entry point to the FSM may be state 706 (Regular-Backup), or state 708 (Upward-Resync). Thus, as these examples illustrate, more generally the finite state machine may be entered at any convenient state as determined by the user and the desired data protection goal.

Unlike a conventional data protection system the data protection service provided by DMS is automated, real-time, and continuous, and it exhibits no or substantially no downtime. This is because DMS is keeping track of the real-time data history, and because preferably the state of the most current data in a DMS region, cluster or node (as the case may be) must match the state of the data in the original host server at all times. In contrast, data recovery on a conventional data protection system means shutting down a host server, selecting a version of the data history, copying the data history back to the host server, and then turning on the host server. All of these steps are manually driven. After a period of time, the conventional data protection system then performs a backup on the changed data. In the present invention, as has been described above, the otherwise separate processes (initial data upload, continuous backup, blackout and data resynchronization, and recovery) are simply phases of the overall data protection cycle. This is highly advantageous, and it is enabled because DMS keeps a continuous data history. Stated another way, there is no gap in the data. The data protection cycle preferably loops around indefinitely until, for example, a user terminates the service. A given data protection phase (the state) changes as the state of the data and the environment change (the incident). Preferably, all of the phases (states) are interconnected to form a finite state machine that provides the data protection service.

The data protection service provided by the DMS has no effective downtime because the data upload, data resynchronization, data recovery and data backup are simply integrated phases of a data protection cycle. There is no application downtime.

The present invention has numerous advantages over the prior art such as tape backup, disk backup, volume replication, storage snapshots, application replication, remote replication, and manual recovery. Indeed, existing fragmented approaches are complex, resource inefficient, expensive to operate, and often reliable. From an architectural standpoint, they are not well suited to scaling to support heterogeneous, enterprise-wide data management. The present invention overcomes these and other problems of the prior art by providing real-time data management services. As has been described, the invention transparently and efficiently captures the real-time continuous history of all or substantially all transactions and data changes in the enterprise. The solution operates over local and wide area IP networks to form a coherent data management, protection and recovery infrastructure. It eliminates data loss, reduces downtime, and ensures application consistent recovery to any point in time. These and other advantages are provided through the use of an application aware I/O driver that captures and outputs a continuous data stream—in the form of an event journal—to other data management nodes in the system.

As one of ordinary skill in the art will appreciate, the present invention addresses enterprise data protection and data management problems by continuously protecting all data changes and transactions in real time across local and wide area networks. Preferably, and as illustrated in FIG. 1, the method and system of the invention take advantage of inexpensive, commodity processors to efficiently parallel process and route application-aware data changes between applications and low cost near storage.

While the present invention has been described in the context of a method or process, the present invention also relates to apparatus for performing the operations herein. In an illustrated embodiment, the apparatus is implemented as a processor and associated program code that implements a finite state machine with a plurality of states and to effect transitions between the states. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows.

I claim:

1. Apparatus comprising a processor and program code to implement a finite state machine with a plurality of states and to effect transitions between the states, the finite state machine providing a data protection service to a data source associated with a host and comprising:
   a first state for acting upon an upload event;
   a second state for acting upon a backup event, the finite state machine transitioning from the first state to the second state upon the occurrence of a given incident;
   a third state for acting upon a resynchronization event, the finite state machine transitioning from the second state to the third state upon the occurrence of a given incident;
   a fourth state for acting upon a recovery initiation event, the finite state machine transitioning to the fourth state from either the second state or the third state upon the occurrence of a given incident;
   a fifth state for acting upon a recovery event, the finite state machine transitioning from the fourth state to the fifth state upon the occurrence of a given incident; wherein, upon completion of the recovery event, the finite state machine transitions from the fifth state back to the second state upon the occurrence of a given incident; and
   a sixth state for acting upon a blackout event that occurs while the finite state machine is in either the second state or the third state;
   wherein the finite state machine transitions from the second state to the sixth state upon occurrence of a given incident, wherein the given incident that causes this transition is a blackout that occurs while the finite state machine is in the second state or the third state.

2. The apparatus as described in claim 1 wherein the finite state machine transitions from the sixth state back to the third state upon the occurrence of a given incident while the finite state machine is in the sixth state.

3. The apparatus as described in claim 2 wherein the given incident that causes the finite state machine to transition from the sixth state back to the third state is a reconnection.

4. The apparatus as described in claim 1 wherein the given incident that causes the finite state machine to transition from the first state to the second state while the finite state machine is in the first state is completion of an upload of a baseline copy of the data source.

5. The apparatus as described in claim 1 wherein the given incident that causes the finite state machine to transition from the second state to the third state while the finite state machine is in the second state is a reboot.

6. The apparatus as described in claim 1 wherein the given incident that causes the finite state machine to transition from the second state to the fourth state while the finite state machine is in the second state is a request to initiate a recovery.

7. The apparatus as described in claim 1 wherein the given incident that causes the finite state machine to transition from the third state to the fourth state while the finite state machine is in the third state is a request to initiate a recovery.

8. The apparatus as described in claim 1 wherein the finite state machine transitions from the third state back to the second state upon the occurrence of a given incident, wherein the given incident that causes this transition is an indication that given data is synchronized.

9. The apparatus as described in claim 1 wherein the given incident that causes the finite state machine to transition from the fourth state to the fifth state while the finite state machine is in the fourth state is an indication that given data recovery is initiated.

10. The apparatus as described in claim 1 wherein the given incident that causes the finite state machine to transition from the fifth state back to the second state while the finite state machine is in the fifth state is an indication that given data recovery is completed.

11. A method of protecting a data source associated with an application, comprising:
    generating an application aware, real-time event data stream by capturing data changes associated with one or more events associated with the data source, the data stream comprising, for each event, data identifying the event, given metadata, and the data changes; and
    protecting the data source without substantially interrupting the application by continuously transitioning among a set of states.

12. The method as described in claim 11 wherein the set of states comprise:
    a first state for acting upon an upload event;
    a second state for acting upon a backup event, the first state transitioning to the second state upon the occurrence of a given incident;
    a third state for acting upon a resynchronization event, the second state transitioning to the third state upon the occurrence of a given incident; and
    a fourth state for acting upon a recovery event, the fourth state being reached by a transition from either a backup event or a resynchronization event;
    wherein, upon completion of the recovery event, the fourth state transitions back to the second state.

13. A method of protecting a data source associated with a host, comprising:
    generating an application aware, real-time event data stream; and
    protecting the data source without interrupting the application, wherein data protection is provided by continuously transitioning among a set of states, comprising:
    a first state for acting upon an upload event;
    a second state for acting upon a backup event, the first state transitioning to the second state upon the occurrence of a given incident;
    a third state for acting upon a resynchronization event, the second state transitioning to the third state upon the occurrence of a given incident;
    a fourth state for acting upon a recovery initiation event, the fourth state being reached by a transition from either the second state or the third state upon the occurrence of a given incident;
    a fifth state for acting upon a recovery event, the fourth state transitioning to the fifth state upon the occurrence of a given incident; wherein, upon completion of the recovery event, the fifth state transitions back to the second state upon the occurrence of a given incident; and
    a sixth state for acting upon a blackout event that occurs during either the second state or the third state, wherein, upon occurrence of a given incident, the second state or the third state, as the case may be, transitions to the sixth state.

14. A method of protecting a data source associated with an application, comprising:

generating from the data source an application aware, real-time event data stream by capturing data changes associated with one or more events associated with the data source, the data stream comprising, for each event, data identifying the event, given metadata, and the data changes; and providing the data source initial data upload, continuous backup, data resynchronization and data recovery as phases of an integrated data protection cycle without substantially interrupting the application.

15. A computer program stored on a computer recordable medium for providing a data protection service to a data source associated with an application, comprising:

program code executable in a processor that generates an application aware, real-time event data stream associated with the data source by capturing data changes associated with one or more events associated with the data source, the data stream comprising, for each event, data identifying the event, given metadata, and the data changes; and program code executable in a processor to implement a finite state machine, the finite state machine protecting the data source without substantially interrupting the application by continuously transitioning among a set of states, the set of states comprising data upload, data backup, data resynchronization and data recovery.

16. The computer program product as described in claim 15 wherein the states are phases of an integrated data protection cycle for the data source.

17. The computer program product as described in claim 15 wherein the finite state machine has a given entry state.

18. The computer program product as described in claim 17 wherein the given entry state is the data upload state.

19. The computer program product as described in claim 15 wherein the finite state machine has a given entry state, wherein the given entry state is selected from a set of states that include: data upload, data backup, data resynchronization and data recovery.

20. The method as described in claim 14 further including the step of transferring the application aware, real-time event data stream to a data store.

21. The method as described in claim 20 wherein the application-aware, real-time event data stream is transferred to the data store over a network for tracking update history.

* * * * *